(12) United States Patent
Corn

(10) Patent No.: US 8,325,289 B2
(45) Date of Patent: Dec. 4, 2012

(54) OPTICAL PART, OPTICAL UNIT AND DISPLAY APPARATUS HAVING A DUST BARRIER COVER

(75) Inventor: Roger Corn, Tokyo (JP)

(73) Assignee: Sony Corporation, Tokyo (JP)

( * ) Notice: Subject to any disclaimer, the term of this patent is extended or adjusted under 35 U.S.C. 154(b) by 770 days.

(21) Appl. No.: 12/142,729

(22) Filed: Jun. 19, 2008

(65) Prior Publication Data

US 2009/0002824 A1    Jan. 1, 2009

(30) Foreign Application Priority Data

Jun. 28, 2007  (JP) ................. P2007-170147

(51) Int. Cl.
  *G02F 1/1333*  (2006.01)
  *G02F 1/1335*  (2006.01)

(52) U.S. Cl. ............................. 349/58; 349/5

(58) Field of Classification Search .............. 349/5, 58
See application file for complete search history.

(56) References Cited

U.S. PATENT DOCUMENTS

| 5,917,561 A | 6/1999 | Hatanaka |
| 2005/0007556 A1* | 1/2005 | Yanagisawa .................... 353/31 |
| 2005/0110963 A1* | 5/2005 | Chan et al. .................... 353/119 |

FOREIGN PATENT DOCUMENTS

| JP | 9-105930 | 4/1997 |
| JP | 10-133303 | 5/1998 |
| JP | 2000-29020 | 1/2000 |
| JP | 2000-292716 | 10/2000 |
| JP | 2001-214664 | 8/2001 |
| JP | 2004-219971 | 8/2004 |
| JP | 2007-025153 | 2/2007 |

* cited by examiner

*Primary Examiner* — Nathanael R Briggs
(74) *Attorney, Agent, or Firm* — Finnegan, Henderson, Farabow, Garrett & Dunner, L.L.P.

(57) ABSTRACT

An optical part includes a panel cover to be attached around a display area of a display element, a holder holding an optical element, a spring pressing the holder against the panel cover in order to place and rotatably attach the holder to the panel cover one over another, and a dust barrier cover provided on the holder, wherein the part of the holder in contact with the spring has an extension, which is integral with the dust barrier cover.

8 Claims, 9 Drawing Sheets

OPTICAL PART, OPTICAL UNIT AND DISPLAY APPARATUS HAVING A DUST BARRIER COVER

CROSS REFERENCES TO RELATED APPLICATIONS

The present invention contains subject matter related to Japanese Patent Application JP 2007-170147 filed in the Japanese Patent Office on Jun. 28, 2007, the entire contents of which being incorporated herein by reference.

BACKGROUND OF THE INVENTION

1. Field of the Invention

The present invention relates to an optical part, optical unit and display apparatus including a holder for adjusting the position of an optical element attached to a display element.

2. Description of the Related Art

A projection display apparatus such as a liquid crystal projector divides the light emitted from a light source into three primary color rays of R (red), G (green) and B (blue), guides them to respectively corresponding display elements (such as liquid crystal panels) through respective predetermined paths, modulates them and synthesizes them at a synthesis prism, the result of which is then enlarged and projected on a screen through a projection optical system (refer to JP-A-10-133303 (Patent Document 1), for example).

In this case, it is important to attach an optical element (or an optical compensator) that defines a predetermined polarization direction to a display element at an accurate angle in order to input light to the display elements. The positioning of the optical element relates to the technologies disclosed in JP-A-9-105930, JP-A-2000-292716 and JP-A-2001-214664 (Patent Documents 2 to 4), for example.

SUMMARY OF THE INVENTION

However, in a case where a holder of an optical element and a panel cover of a display element, which are placed one over another, are rotatably provided as a mechanism of adjusting the angle of the optical element, the contact resistance at the slide part may prevent the smooth movement of the angle adjustment, and/or the contact at the slide part may cause dust, which are problems.

According to an embodiment of the present invention, there is provided an optical part including a panel cover to be attached around a display area of a display element, a holder holding an optical element, a spring pressing the holder against the panel cover in order to place and rotatably attach the holder to the panel cover one over another, and a dust barrier cover provided on the holder, wherein the part of the holder in contact with the spring has an extension, which is integral with the dust barrier cover.

This embodiment may have an extension, which is integral with the dust barrier cover, and the extension may be provided at the part in contact with the spring of the holder. Therefore, the holder can be moved smoothly when rotated, without the direct contact between the holder and the spring. Furthermore, scratches on the holder can be prevented.

The dust barrier cover may be provided on both of the surface on the panel cover side and the surface on the opposite side of the holder, and the ends may communicate with each other. Therefore, the dust barrier cover can be integrated on both of the front and back faces of the holder.

According to another embodiment of the invention, there is provided an optical unit that divides the light irradiated from a light source into multiple color rays, guides them to display elements for respective colors and synthesizes the rays modulated by the display elements, the unit including a panel cover to be attached around display areas of the display elements, a holder holding an optical element, a spring pressing the holder against the panel cover in order to place and rotatably attach the holder to the panel cover one over another, and a dust barrier cover provided on the holder, wherein the part of the holder in contact with the spring has an extension, which is integral with the dust barrier cover.

This embodiment may have an extension, which is integral with the dust barrier cover, and the extension may be provided at the part in contact with the spring of the holder. Therefore, the direct contact between the holder and the spring can be prevented without losing the dust barrier. Furthermore, the holder can be moved smoothly when rotated, and scratches on the holder can be prevented.

According to another embodiment of the invention, there is provided a display apparatus including a light source, an optical unit that divides the light irradiated from the light source into multiple color rays, guides them to display elements for respective colors and synthesizes the rays modulated by the display elements, and a projection optical system that projects the light synthesized by the optical unit, wherein the optical unit includes a panel cover to be attached around the display areas of the display elements, a holder holding an optical element, a spring pressing the holder against the panel cover in order to place and rotatably attach the holder to the panel cover one over another, and a dust barrier cover provided on the holder, and the part of the holder in contact with the spring has an extension, which is integral with the dust barrier cover.

This embodiment may have an extension, which is integral with the dust barrier cover, and the extension may be provided at the part in contact with the spring of the holder. Therefore, the direct contact between the holder and the spring can be prevented without losing the dust barrier characteristic. Furthermore, the holder can be moved smoothly when rotated, and scratches on the holder can be prevented.

According to the embodiments of the invention, in adjusting the angle of the holder of the optical element, scratches on the holder due to the contact with the spring can be prevented, and the occurrence of dust can be suppressed. Furthermore, since the extension, which is integral with the dust barrier cover, is provided between the spring and the holder, the direct contact between the spring and the holder can be prevented, and the smooth rotation of the holder can be achieved.

DESCRIPTION OF THE PREFERRED EMBODIMENTS

With reference to drawings, embodiments of the invention will be described below.

[Display Apparatus: Rear-Projector]

Figure 1:
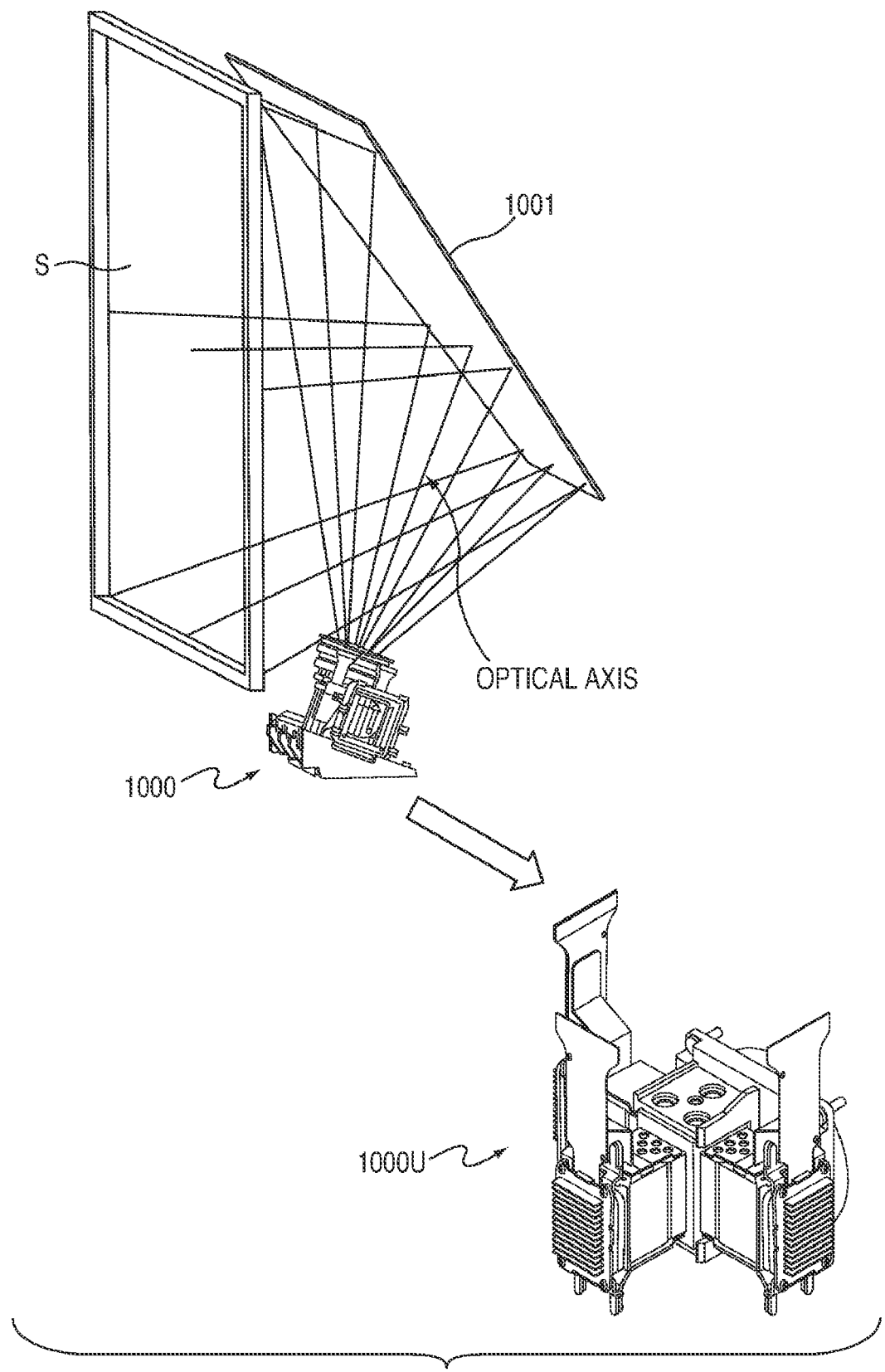
FIG. 1 is a schematic diagram illustrating the rear-projector, which is an example of the display apparatus according to an embodiment of the invention.

FIG. 1 is a schematic diagram illustrating a rear-projector, which is an example of the display apparatus according to an embodiment of the invention. The rear-projector includes a liquid crystal projector 1000 within a cabinet, a reflection mirror 1001 and a screen S.

The liquid crystal projector 1000, which is the main part of the rear-projector, includes an optical unit 1000U in which a display element (liquid crystal panel: liquid crystal display device) is attached around a prism block. The light emitted from a light source is modulated to an image by the optical unit 1000U, is projected to and reflected by the reflection mirror 1001 and is projected from the back face of the screen S.

According to this embodiment, in the optical unit 1000U in the liquid crystal projector 1000, a mechanism of holding the optical element to be attached according to the display element allows the smooth angle adjustment and can suppress the occurrence of dust in the simple configuration.

[Display Apparatus: Liquid Crystal Projector]

Figure 2:
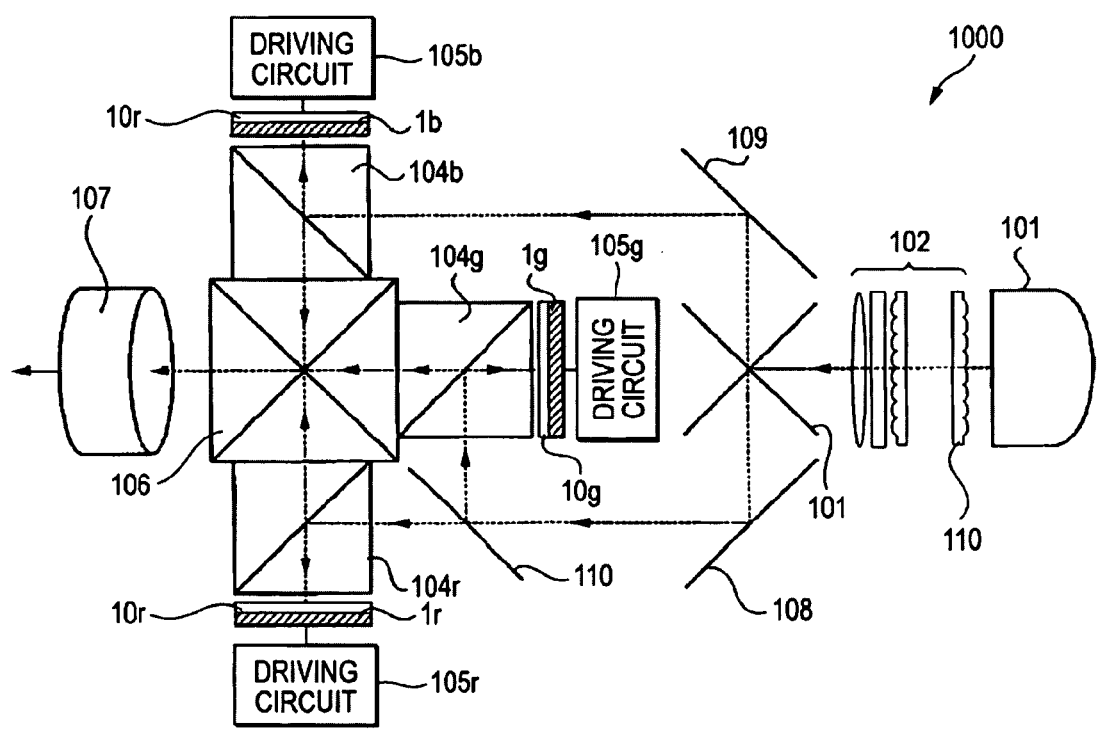
FIG. 2 is a schematic diagram showing an example of the liquid crystal projector, which is an example of the display apparatus according to an embodiment of the invention.

FIG. 2 is a schematic diagram showing an example of the liquid crystal projector, which is an example of the display apparatus according to an embodiment of the invention. The liquid crystal projector 1000 is mainly applied to the rear projector shown in FIG. 1 but may be applicable to other apparatus such as front-projector.

In other words, the liquid crystal projector 1000 according to this embodiment includes a light source 101, a lens unit 102, a dichroic color separation filter 103, beam splitters 104r, 104g and 104b, liquid crystal display devices 1r, 1g and 1b, optical compensators 10r, 10g and 10b, driving circuits 105r, 105g and 105b, a prism (dichroic mirror) 106 and a projection lens 107.

In this system, the light emitted from the light source 101 is transmitted from the lens unit 102 to the dichroic color separation filter 103, where the light is split into two directions. The light split into two directions are transmitted to the display unit including the reflective liquid crystal display devices 1r, 1g and 1b corresponding to the three colors of R (red), G (green) and B (blue) through all-reflection mirrors 108 and 109, the beam splitters 104r, 104g and 104b, the dichroic mirror 110 and the prism 106.

For example, the light from the light source 101 enters to the liquid crystal display device 1r corresponding to R (red) from the dichroic color separation filter 103 through the all-reflection mirror 108, the beam splitter 104r and the optical compensator 10r. The light from the light source 101 enters to the liquid crystal display device 1g corresponding to G (green) from the dichroic color separation filter 103 through the all-reflection mirror 108, the dichroic mirror 110, the beam splitter 104b and the optical compensator 10g. The light from the light source 101 enters to the liquid crystal display device 1b corresponding to B (blue) from the dichroic color separation filter 103 through the all-reflection mirror 109, the beam splitter 104b and the optical compensator 10b.

The liquid crystal display devices 1r, 1g and 1b are provided through the beam splitters 104r, 104g and 104b respectively for multiple planes of the prism 106, which is a dichroic mirror. The liquid crystal display devices 1r, 1g and 1b are driven by the corresponding driving circuits 105r, 105g and 105b, respectively, and reflect the incident light as images through the liquid crystal layers. The images are synthesized by the prism 106, and the result is transmitted to the projection lens 107. Thus, the images corresponding to the three colors of R (red), G (green) and B (blue) are projected on a screen, not shown, and are reproduced as a color image.

The liquid crystal projector shown in FIG. 2 is a reflection liquid crystal projector that reflects and modulates the light emitted from the light source 101 at the liquid crystal display devices 1r, 1g and 1b but is also applicable to a transmission liquid crystal projector that transmits and modulates light by the liquid crystal display devices 1r, 1g and b.

[Optical Unit]

The optical unit 1000U according to this embodiment includes a combination of the lens unit 102 containing a Fly eye lens 110, the dichroic color separation filter 103, the all-reflection mirrors 108 and 109, the dichroic mirror 110, the optical compensators 10r, 10g and 10b, the display devices (or the liquid crystal display devices 1r, 1g and 1b) and the beam splitters 104r, 104g and 104b respectively corresponding to the display devices in the configuration of the liquid crystal projector 1000 shown in FIG. 2. However, the optical unit 1000U may be configured by other combination.

[Optical Part]

Figure 3:
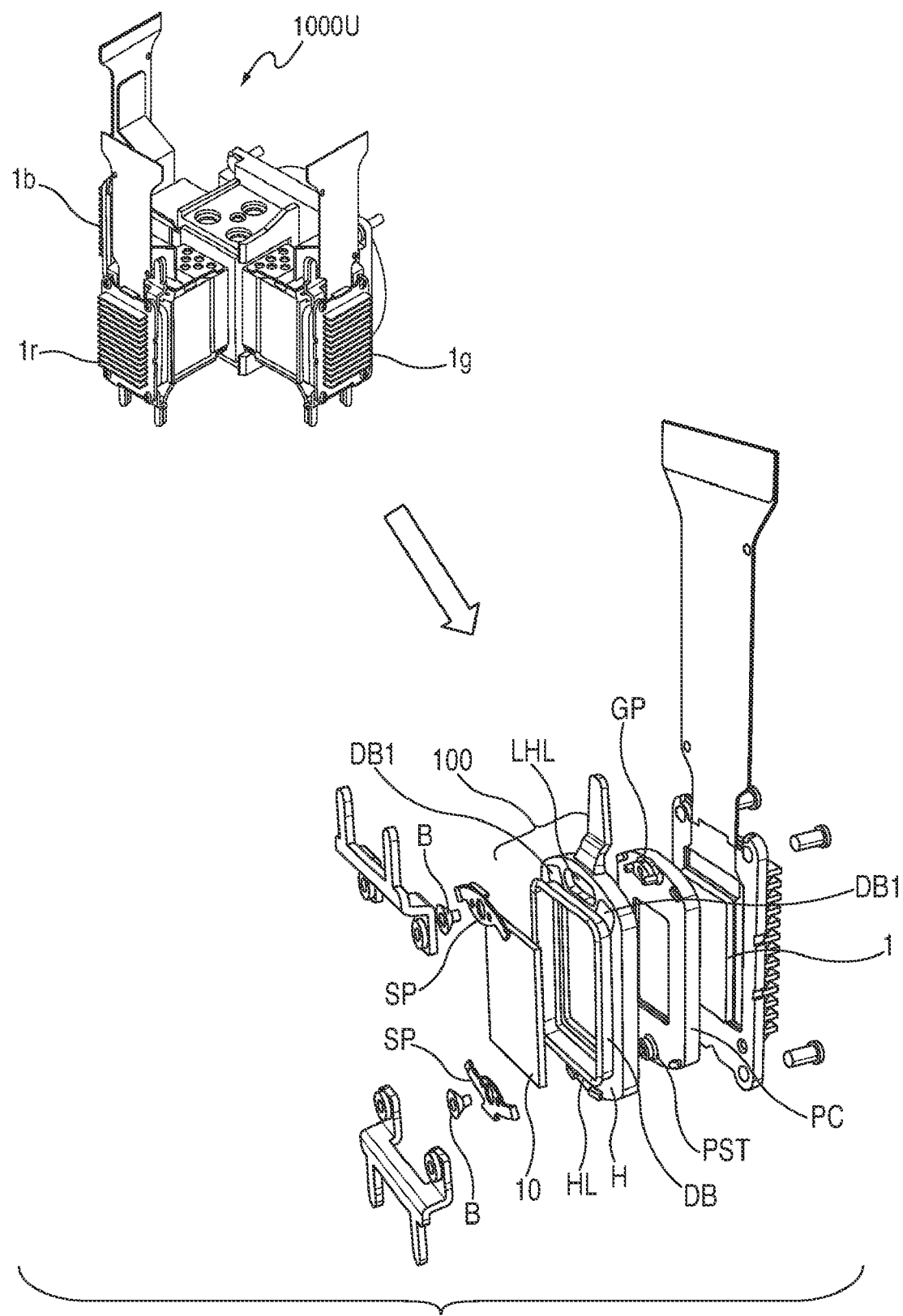
FIG. 3 is a schematic exploded perspective diagram illustrating the optical part according to an embodiment of the invention.

FIG. 3 is a schematic exploded perspective diagram illustrating an optical part according to an embodiment of the invention. An optical part 100 according to an embodiment of the invention includes a mechanism that attaches an optical element (which is an optical compensator or retarder according to this embodiment) facing against the liquid crystal devices 1, which are display elements, to the liquid crystal devices 1 in a manner allowing adjustment of the angle.

The liquid crystal display devices 1 (or liquid crystal devices 1r, 1g and 1b for respective colors) are provided for R (red), G (green) and B (blue) around the prism block in the optical unit 1000U, and the optical compensator 10 is attached to each of the liquid crystal display devices 1. As shown in the exploded perspective view in FIG. 3, the optical part 100 includes a panel cover PC to be attached around the display area of each of the liquid crystal display devices 1 and a holder H holding each of the optical compensators 10. The holder H is placed over the panel cover PC and is attached rotatably thereto about the axis on the end side of the panel cover PC.

The panel cover PC is fixed to the frame of the liquid crystal display device 1 by an adhesive, for example. Since the panel cover PC is frame-shaped, the panel cover PC is fixed around the display area of the liquid crystal display device 1 by attaching it to the liquid crystal display device 1.

The surface of the panel cover PC on the liquid crystal display device 1 side has a concave corresponding to the external form of the liquid crystal display device 1. By fitting the liquid crystal display device 1 into the concave, the mechanical positioning between the panel cover PC and the liquid crystal display device 1 can be performed accurately.

One end (or the lower end in the figure) on the outer side of the panel cover PC has a cylindrical post PST. The other end (or the upper end in the figure) on the outer side of the panel cover PC has a guide post GP that guides orbit of the rotational operation by the holder H.

The holder H is frame-shaped, and the optical compensator 10 is mountable within the frame. A dust barrier cover DB is provided around the frame on the front and back of the holder H and prevents intrusion of dust into the space between the optical compensator 10 and the liquid crystal display device 1 when it is attached to the prism block along with the liquid crystal device 1.

The part of the dust barrier cover DB on the panel cover PC side is configured to keep the contact with the panel cover PC even when the holder H moves. In other words, in a case where the holder H is rotated in a movable range, the contact between the dust barrier cover DB and the panel cover PC is kept within the frame of the panel cover PC in order to prevent losing the dust barrier characteristic even when the holder H rotates.

One end (or the lower end in the figure) of the holder H has a hole HL into which the post PST of the panel cover PC fits. The other end (the upper end in the figure) of the holder H has a long hole LHL which accepts the guide post GP of the panel cover PC. The diameter of the long hole LHL is larger than the diameter of the guide post GD and has an arc shape.

Thus, when the holder H is placed over the panel cover PC, the lower end is supported about the post PST, and the upper end can rotate by the angle according to the space between the guide post GP and the long hole LHL.

The post PST and the guide post GP have a bolt hole for holding the holder H over the cover PC and fixing the holder H through a spring SP by a bolt B. The degree of bolting the bolt B can be adjusted by the force for the rotation of the holder H.

According to this embodiment, the part of the holder H in contact with the spring SP integrally has extensions DB1 from the dust barrier cover DB with the holder H attached to the panel cover PC. The spring SP is abutted against the holder H through the extensions DB1. Thus, the spring SP is not directly contact with the holder H, and the holder H can move smoothly in rotating. Furthermore, scratches on the holder H by the spring SP can be prevented, and the occurrence of dust can be suppressed.

Figure 4:
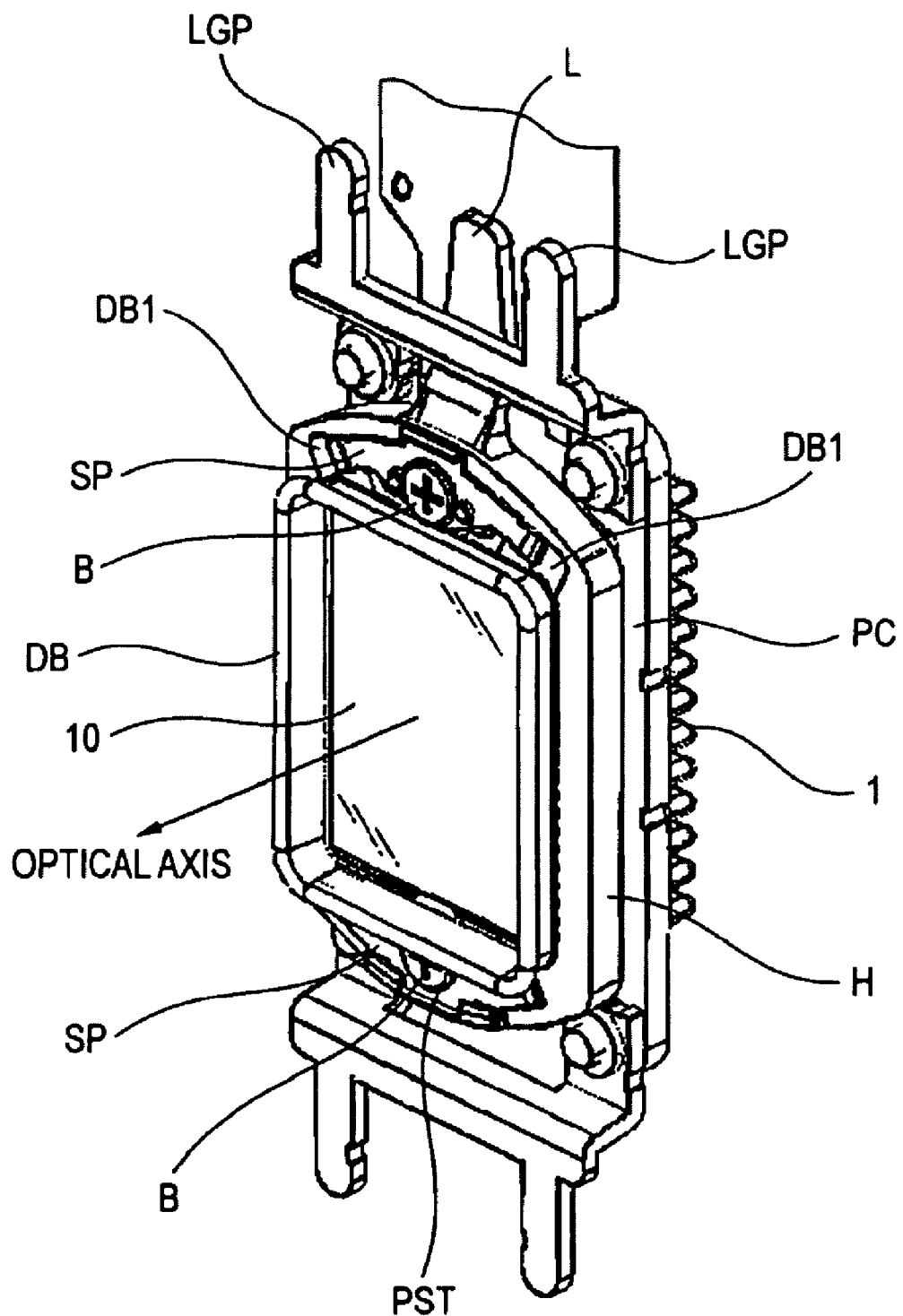
FIG. 4 is a schematic perspective diagram showing a state that a holder and a panel cover are fixed one over another and are attached to a liquid crystal panel.

FIG. 4 is a schematic perspective diagram showing a state that the holder and the panel cover are fixed one over another with the liquid crystal display device 1 attached. In this way, by placing the holder H and the panel cover PC one over another and fixing the upper end and the lower end with the bolt B through the spring SP, the holder H is pressed against the panel cover PC by the urging force of the spring SP.

The upper end of the holder H can rotate about the post PST along the orbit of the long hole LHL. The urging force of the spring SP is increased by strongly bolting the bolts B at the upper and lower ends of the holder H, which can increase the force for the rotation of the holder H. On the other hand, loosing the bolt B can decrease the urging force of the spring SP, which can decrease the force for the rotation of the holder H.

The rotation of the holder H as described above can change the angle of the optical compensator 10 held by the holder H. By aligning the post PST and the movable end with the axis along the longitudinal direction of the liquid crystal display device 1, the movable range of the holder H (or the adjustable angle of the optical compensator 10) can be increased.

The upper end of the holder H has a lever L for angle adjustment. The panel cover on the side having the lever has a guide post LGP through the lever. Thus, the lever L can be moved by being supported by the guide post LGP, and the lever L can be moved easily. Furthermore, the space between the guide post LGP and the lever L can provide a guideline for the stroke (or the rotated angle) of the lever L.

Since the extensions DB1 of the dust barrier cover DB as described above extend from the shoulder parts of the dust barrier cover DB corresponding to the positions at the left and right ends of the spring SP, the left and right ends of the spring SP are abutted against the extensions DB1.

Since the holder H is held between the spring SP and the panel cover PC in the assembled state, the holder H slides between the spring SP and the panel cover PC. Therefore, the rotated holder H may be brought into contact with the left and right ends of the spring SP. However, because of the extensions DB1 of the dust barrier cover DB according to this embodiment, the spring SP slides in contact with the extensions DB1.

Since the dust barrier cover DB contains silicon rubber, for example, the contact friction by the slide of the holder H with the spring SP in contact with the extensions DB1 is lower than that of the direct contact with the holder H, which implements the smooth rotation of the holder H. Furthermore, the spring SP prevents the scratches on the holder H and can suppress the cause of dust.

[Rotating Operation of Optical Part]

Figure 5A:
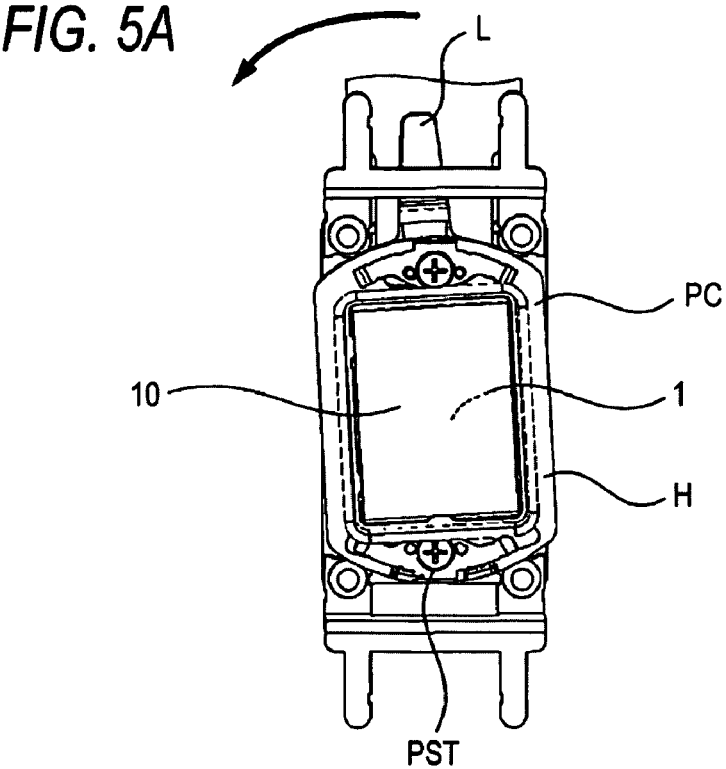
FIGS. 5A and 5B are schematic diagrams illustrating a rotating operation by the optical part.
Figure 5B:
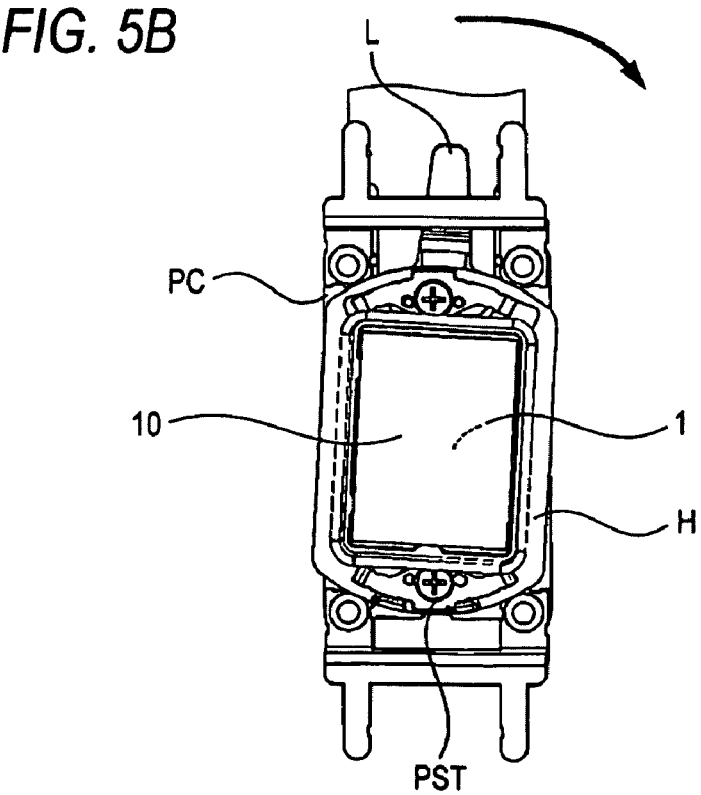

FIGS. 5A and 5B are schematic diagrams describing a rotating operation of the optical part. As described above, the upper end of the holder H is attached to the panel cover PC about the lower end as the post PST. Therefore, a rotating operation thereof about the post PST is allowed by moving the lever L at the upper end of the holder H horizontally in FIGS. 5A and 5B. The range of the rotating operation may be the left or right space from the state with the guide post at the center of the long hole.

FIG. 5A shows a state that the holder has been moved to the left side. By moving the lever L at the upper end of the holder H to the left side, the upper end (movable end) moves to the left side in an arc shape about the post PST, and the angle of the optical compensator 10 supported by the holder H tilts to the left. This allows the adjustment of the angle of the optical compensator 10 to move to the left about the liquid crystal display device 1.

FIG. 5B on the other hand shows a state that the holder has been moved to the right side. By moving the lever L at the upper end of the holder H to the right side, the upper end (movable end) moves to the right side in an arc shape about the post PST, and the angle of the optical compensator 10 supported by the holder H tilts to the right. This allows the adjustment of the angle of the optical compensator 10 to move to the right about the liquid crystal display device 1.

In the optical part 100 of this embodiment, the upper end of the holder H rotates and moves about one point (one axis) of the lower end, which means that the rotation is not about the optical axis at the center of the display of the liquid crystal display device 1. However, since the liquid crystal display device 1 and the optical compensator 10 are flat and have substantially even optical characteristics, no optical problems are caused by the rotation about one point (one axis) of the lower end. Furthermore, since the position in the optical axis direction is fixed, the displacement of the back focus does not occur.

The rotating mechanism about the lower end of the holder H in this way can simplify the structure more than the mechanism that rotates about the optical axis and can reduce the size of the apparatus. Furthermore, the holder H can be rotated with the holder H supporting the optical compensator 10 attached to the panel cover PC. Therefore, the adjustment is allowed with the holder H assembled into an actual apparatus. After the adjustment of the angle of the holder H is performed, the lever L at the upper end and the panel cover PC can be robustly fixed by coating an ultraviolet curing adhesive therebetween and irradiating ultraviolet thereto, for example.

[Structure of Dust Barrier Cover]

Next, with reference to FIGS. 6 to 9, the structure of the dust barrier cover of this embodiment will be described. The liquid crystal display device side of the holder H and the opposite side of the liquid crystal display device side are the back and front sides, respectively, for convenience of descriptions below.

Figure 6:
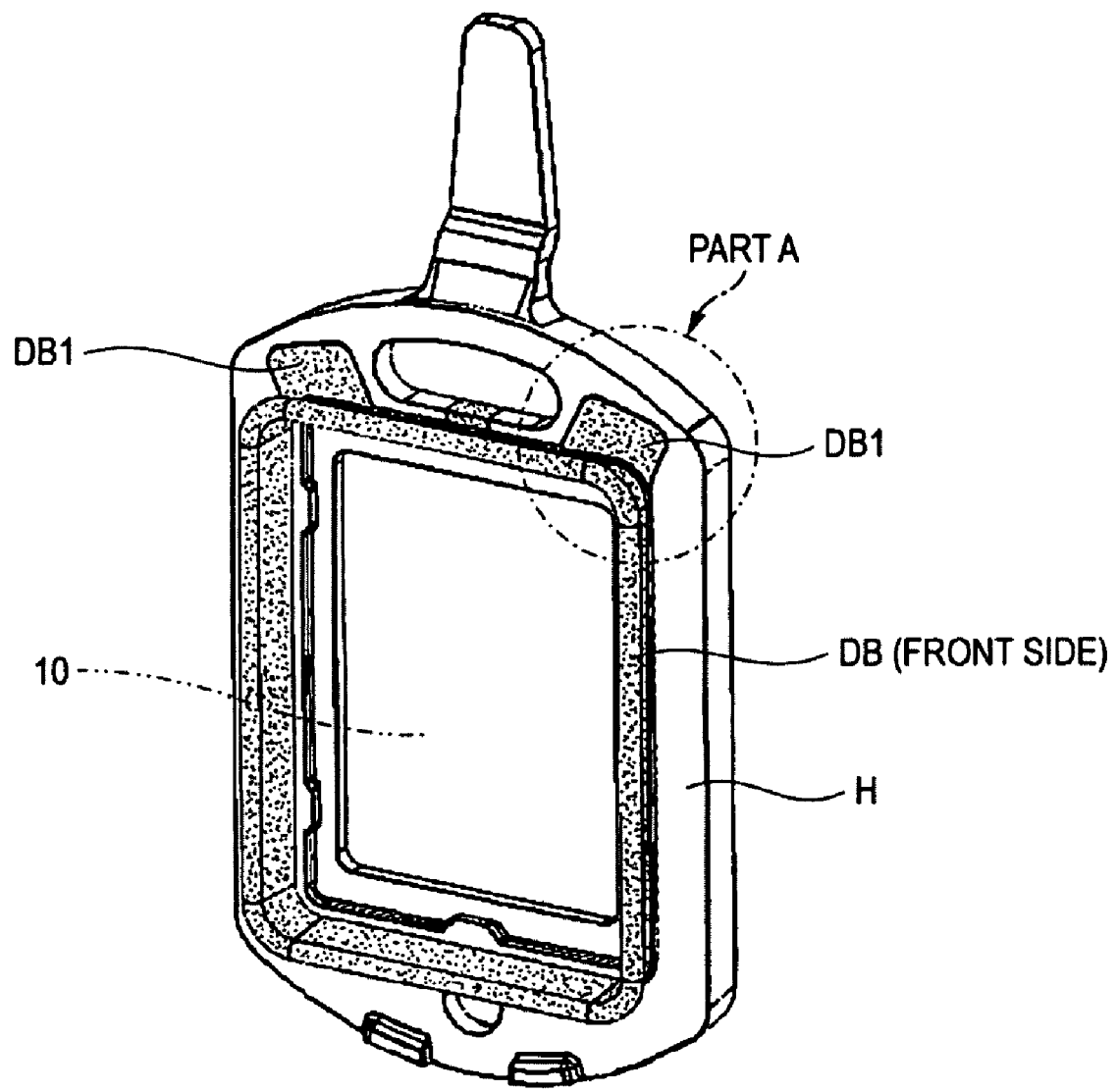
FIG. 6 is a schematic perspective diagram illustrating the structure of a dust barrier cover (front side)

As shown in FIG. 6, the dust barrier cover (front side) DB is provided on the front side of the holder H. The dust barrier cover (front side) DB is provided around the frame holding the optical element 10, and the extensions DB1, which are the feature of this embodiment, are integrated from both upper shoulders thereof.

The dust barrier cover DB may be produced by injection molding, for example. In other words, a pre-molded holder H (formed by a metallic material such as magnesium) is assembled into a cavity of an injection molding die, and, under this state, silicon rubber, for example, which is a material of the dust barrier cover DB, is injected to mold. In this case, coating an adhesive in advance over the surface on which the dust barrier cover DB of the holder H is to be placed allows the secure bonding of the dust barrier cover DB to the holder H after the molding.

Figure 7:
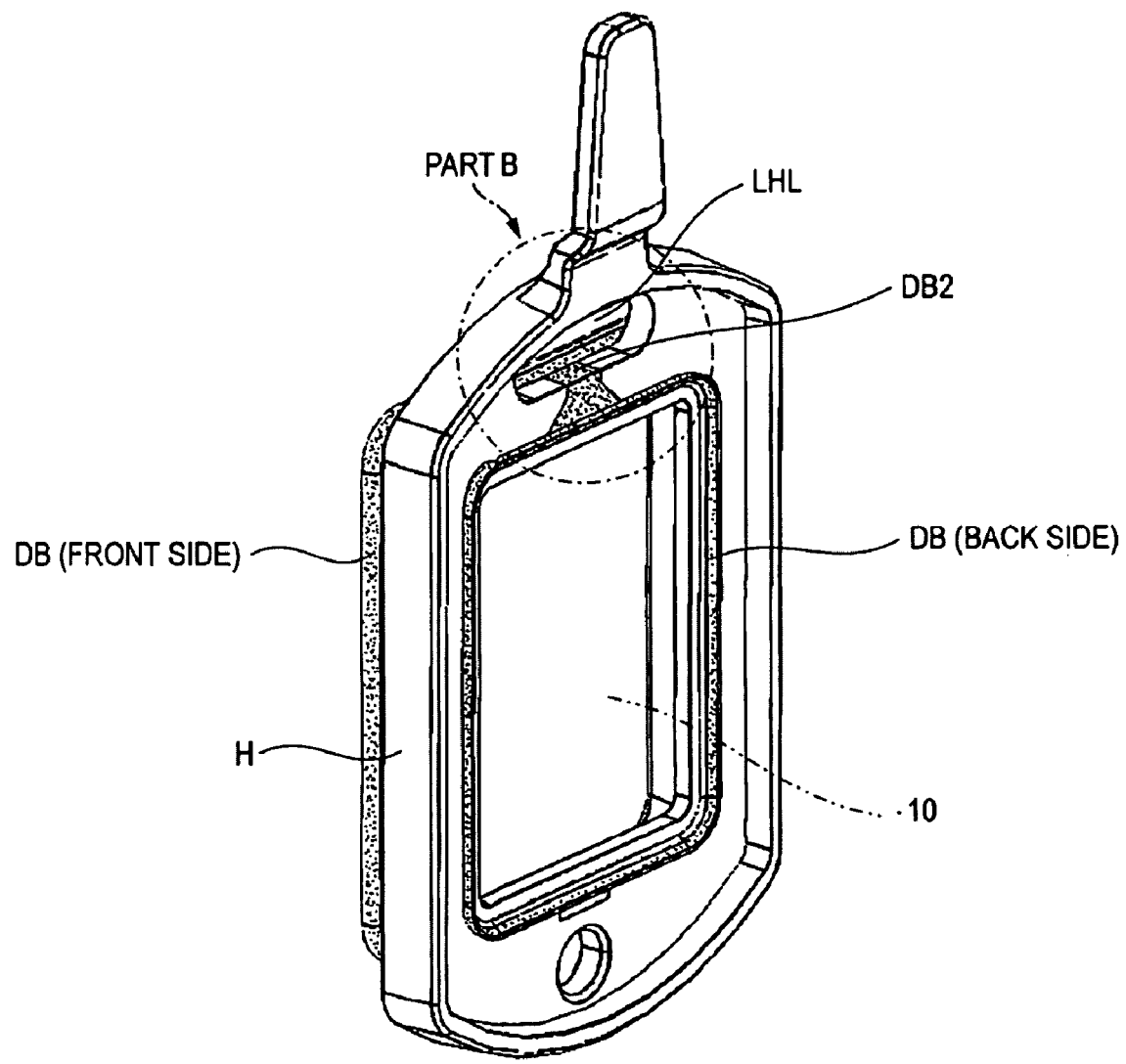
FIG. 7 is a schematic perspective diagram illustrating the structure of the dust barrier cover (back side)

FIG. 7 is a schematic diagram illustrating the structure of the dust barrier cover on the back side of the holder. The back side of the holder H is the side in contact with the panel cover PC (refer to FIG. 3) of the liquid crystal display device. The dust barrier cover (back side) DB on the back side of the holder H is brought into contact with the panel cover PC when the holder H is assembled thereto, which can prevents the intrusion of dust from the outside to the liquid crystal display device.

Since the optical element 10 is placed within the frame of the holder H, it is difficult to allow the communication between the dust barrier covers DB on the back and front sides through the inside of the frame. Accordingly, this embodiment allows the communication between the dust barrier cover (front side) DB and the dust barrier cover (back side) DB through the long hole LHL of the holder H. In other words, a communicating part DB2 is provided along the inner surface of the long hole LHL, and the communicating part DB2 integrates the front and back dust barrier covers DB.

In this way, the structure that integrates the front and back dust barrier covers DB through the communicating part DB2 allows the attachment of the dust barrier cover DB to the front and back of the holder H by performing injection molding once.

Figure 8:
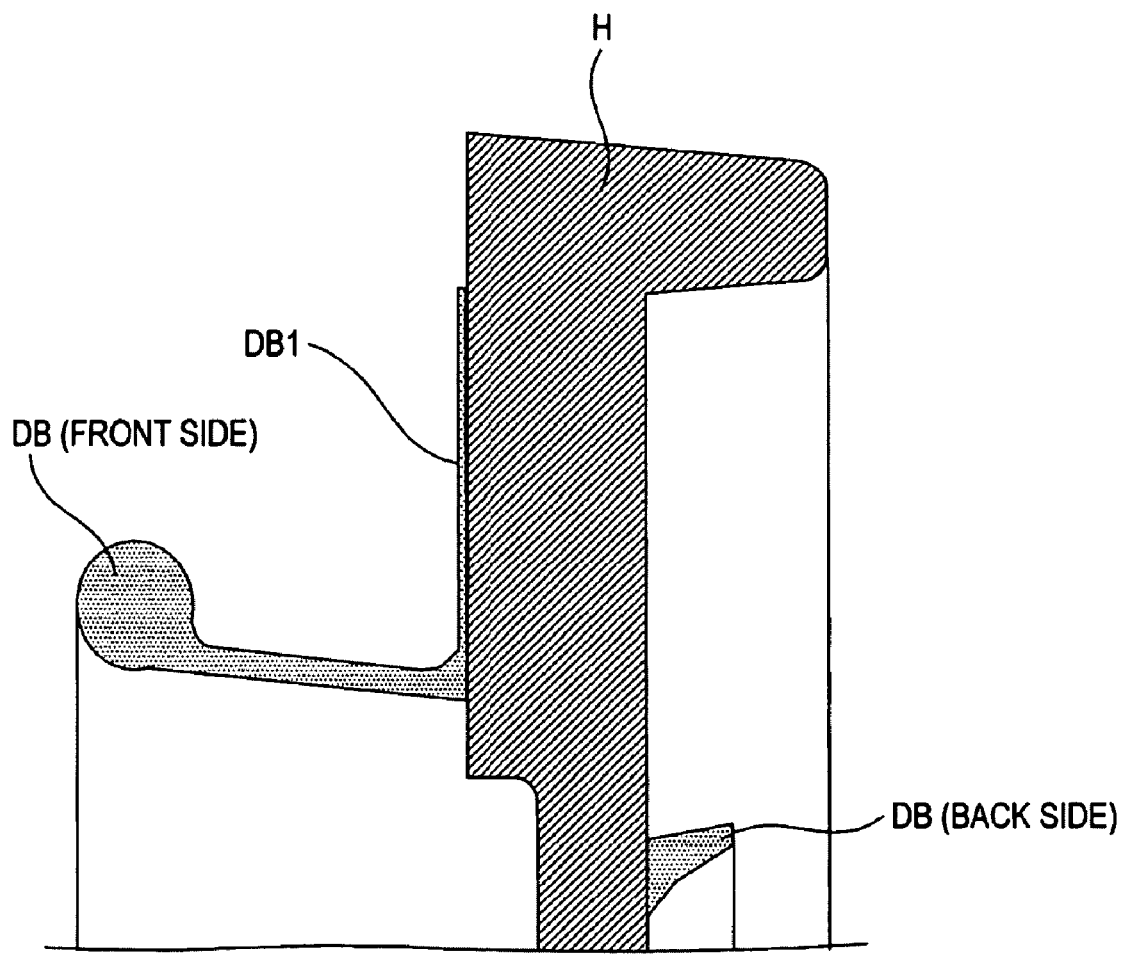
FIG. 8 is an enlarged section view of the part A.

FIG. 8 is a partially enlarged section view of the part A in FIG. 6. The front side of the holder H has the extension DB1, which is integral with the dust barrier cover (front side) DB. The extension DB1 is about 30 μm thick, for example, which is not the thickness that obstructs even when it is on the holder H.

Figure 9:
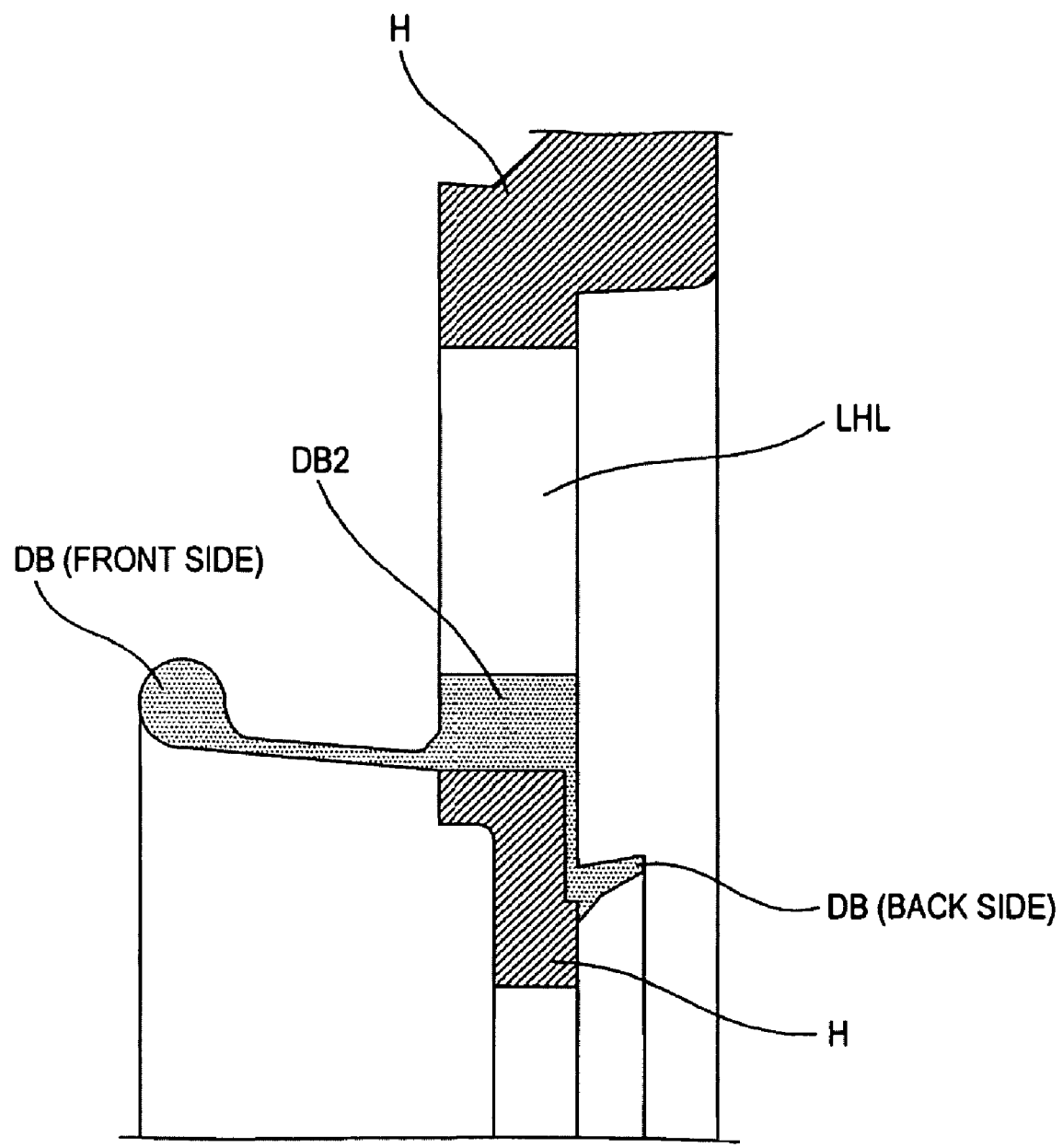
FIG. 9 is an enlarged section view of the part B.

FIG. 9 is a partially enlarged section view of the part B in FIG. 7. The communicating part DB2 communicates the dust barrier cover (front side) DB on the front side and the dust barrier cover (back side) on the back side of the holder H and is provided along the inner surface of the long hole LHL of the holder H. The long hole LHL functions as a guide for rotating the holder H. Therefore, providing a concave groove on the inner surface and providing the communicating part DB2 within the concave groove can prevent the influence of the thickness of the communicating part DB2 on the guiding function of the long hole LHL.

The front and back dust barrier covers DB can be formed simultaneously by performing injection molding once by flowing into the front and back through the communicating part DB2 in the injection molding.

Having described the embodiments by using the optical compensator 10 as an example of the optical element included in the optical part 100, the invention is not limited thereto but is applicable to other optical elements (such as a polarizer and a phase retarder).

It should be understood by those skilled in the art that various modifications, combinations, sub-combinations and alterations may occur depending on design requirements and other factors insofar as they are within the scope of the appended claims or the equivalents thereof.

What is claimed is:

1. An optical part comprising:
   a panel cover to be attached around a display area of a display element;
   a holder holding an optical element;
   a spring pressing the holder against the panel cover in order to place and rotatably attach the holder to the panel cover;
   a dust barrier cover provided on the holder, the dust barrier cover having an extension in contact with the spring and an opening to accept the optical element; and
   a guide post on the panel cover, the guide post guiding a rotational operation of the holder.

2. The optical part according to claim 1, wherein the dust barrier cover comprises a first portion provided on a first side of the holder facing the panel cover and a second portion provided on a second side of the holder opposite to the first side, and the ends of the first portion and the second portion communicate with each other.

3. The optical part according to claim 1, wherein the dust barrier cover contains silicon rubber.

4. An optical unit that divides the light irradiated from a light source into multiple color rays, guides them to display elements for respective colors and synthesizes the rays modulated by the display elements, the unit comprising:
   a panel cover to be attached around the display areas of the display elements;
   a holder holding an optical element;
   a spring pressing the holder against the panel cover in order to place and rotatably attach the holder to the panel cover;
   a dust barrier cover provided on the holder, the dust barrier cover having an extension in contact with the spring and an opening to accept the optical element; and
   a guide post on the panel cover, the guide post guiding a rotational operation of the holder.

5. A display apparatus comprising:
   a light source;
   an optical unit that divides the light irradiated from the light source into multiple color rays, guides the color rays to display elements for respective colors and synthesizes the color rays modulated by the display elements; and
   a projection optical system that projects the light synthesized by the optical unit,
   wherein the optical unit includes
      a panel cover to be attached around the display areas of the display elements,
      a holder holding an optical element,
      a spring pressing the holder against the panel cover in order to place and rotatably attach the holder to the panel cover,
      a dust barrier cover provided on the holder, the dust barrier cover having an extension in contact with the spring and an opening to accept the optical element, and
      a guide post on the panel cover, the guide post guiding a rotational operation of the holder.

6. The optical part according to claim 2, wherein the holder comprises a hole to accept the guide post.

7. The optical part according to claim 6, wherein the dust barrier cover further comprises a third portion connecting the first portion and the second portion, and extending through the hole.

8. The optical part according to claim 1, wherein the dust barrier cover is sandwiched between the holder and the optical element.

* * * * *